United States Patent
Klosiewicz et al.

(10) Patent No.: US 6,825,291 B2
(45) Date of Patent: Nov. 30, 2004

(54) THERMALLY POLYMERIZED COPOLYMERS MADE FROM STYRENE AND DICYCLOPENTADIENE MONOMERS

(75) Inventors: Daniel Klosiewicz, Newark, DE (US); Atanu Biswas, Newark, DE (US)

(73) Assignee: Eastman Chemical Resins, Inc., Kingsport, TN (US)

(*) Notice: Subject to any disclaimer, the term of this patent is extended or adjusted under 35 U.S.C. 154(b) by 151 days.

(21) Appl. No.: 09/734,156

(22) Filed: Dec. 11, 2000

(65) Prior Publication Data

US 2002/0107332 A1 Aug. 8, 2002

(51) Int. Cl.⁷ .................................................. C08F 2/00
(52) U.S. Cl. ............................ 526/87; 526/336; 526/87
(58) Field of Search .................................... 526/336, 87

(56) References Cited

U.S. PATENT DOCUMENTS 2,689,232 A    9/1954   Gerhart
5,171,793 A   12/1992   Johnson et al.
5,502,140 A    3/1996   Daughenbaugh et al.
5,739,239 A    4/1998   Daughenbaugh et al.

FOREIGN PATENT DOCUMENTS

EP       0845484 A2    6/1998

*Primary Examiner*—Bernard Lipman
(74) *Attorney, Agent, or Firm*—Polly C. Owen; Bernard J. Graves, Jr.

(57) ABSTRACT

A hydrocarbon resin is prepared by (1) thermally polymerizing a mixture consisting essentially of (a) about 5% to 25% by weight styrene or aliphatic or aromatic substituted styrene, and (b) about 95% to 75% by weight based on total monomer content of a cyclic diolefin component comprising at least about 50% by weight dicyclopentadiene. A method of producing an aromatic-modified resin having a Mz of less than 2000 through the addition of about 5% to 25% by weight styrene in combination with about 95% to about 75% DCPD monomer at a rate to consume styrene monomer at a the rate at which it is added. Hydrogenation of this resin produces light colored, thermally stable products that are useful as tackifiers in adhesives.

10 Claims, No Drawings

THERMALLY POLYMERIZED COPOLYMERS MADE FROM STYRENE AND DICYCLOPENTADIENE MONOMERS

FIELD OF THE INVENTION

The present invention relates to hydrogenated styrene-modified dicyclopentadiene resins and their process of manufacture. More particularly, the present invention relates to thermally polymerized copolymers made from styrene and dicyclopentadiene monomers having relatively low odor, light color, and low molecular weights.

DESCRIPTION OF THE RELATED TECHNOLOGY

Various methods have been used to thermally copolymerize dicyclopentadiene (DCPD) feedstocks with vinyl aromatic hydrocarbons and hydrogenating these copolymer reaction products. Providing aromatic content to the resins influences compatibility with other polymers, and it is desired to achieve this compatibility property in combination with desirable softening point values, desirable molecular weights, low color, and other properties which are particularly useful in tackifier applications.

Numerous methods have been utilized to provide aromatic content to DCPD resins produced by thermal reaction processes. Typically a batch method is used where a vinyl aromatic material is charged along with DCPD to a thermal reactor and the combined mixture is heated to a reaction temperature typically in the range 240° C. to 300° C. to cause reaction and form a partially aromatic resin. An example is found in U.S. Pat. No. 5,171,793 where a mixture comprised predominantly of a crude vinyl aromatic feedstock ( C9 type feed containing principally methyl substituted styrenes and indene as reactive components ) combined with DCPD is charged batchwise to a reactor and heated to high temperature to oligomerize the reactants and form a resin product which was subsequently hydrogenated to produce a useful adhesive tackifier resin. This crude vinyl aromatic feedstock is a byproduct from petroleum processing.

An example of the use of a pure monomer aromatic feed in combination with DCPD is disclosed in U.S. Pat. Nos. 5,502,140 and 5,739,239 which disclose thermally polymerized copolymers of DCPD and α-methylstyrene (AMS), which are subsequently hydrogenated. The use of higher levels of styrene was specifically acknowledged in these patent examples to produce resin products with undesirable high molecular weight characteristics, and the preferred use of AMS over styrene for producing thermal DCPD copolymer resins was specifically identified in these patent examples.

In the DCPD thermal reactions such as those described in U.S. Pat. Nos. 5,171,793, 5,502,140 and 5,739,239 only a fraction of the reactive vinyl components in the batch charge (hereafter referred to as reactives) are converted to resin during the thermal reaction. Typically between 50% to 75% of the reactives in the batch charge are converted to resin product during the thermal reaction. The residual reactives possess sufficient chemical reactivity that they could be further converted to resin by physically separating them from the resin product (e.g. by vacuum stripping ) before hydrogenation and recycling these recovered reactives into a subsequent batch charge. Due to the relatively low reactivity of AMS, relative to vinyl aromatics such as styrene, in U.S. Pat. Nos. 5,502,140 and 5,739,239 only about 50% of the AIMS in the starting charge is consumed during the thermal reaction, requiring the remainder to be recycled back into the process. The presence of high levels of AMS in combination with unreacted olefin materials derived from DCPD in the recycle from a thermal reaction makes it difficult to accurately characterize the recycle composition and subsequently determine the composition of the batch charge (containing recycle) which is used in a subsequent thermal reaction. This makes it difficult to produce a consistent thermal resin product when recycle is used.

Additionally, while these resins produced from DCPD and AMS have been found to be useful, their colors are often darker than desired, even after hydrogenation. Hydrogenation of thermal DCPD resins is utilized to eliminate olefin unsaturation, reduce or eliminate color, and to controllably reduce the aromatic nature of the resin in order to obtain desired properties. Depending on the catalyst chosen, hydrogenation can selectively remove color rather than eliminate aromatic content, so that lighter colors can be obtained through hydrogenation without significantly reducing the aromatic content of the resin. It is desirable to produce a thermal polymerization product that does not require extensive hydrogenation of aromatic functionality which increases the required hydrogen consumption and causes other process difficulties. Additionally it is desirable that thermal DCPD resins can be hydrogenated to light colored products without excessive hydrogenation time or excessively severe hydrogenation conditions. Generally, it is desirable to produce an aromatic modified DCPD thermal resin which has the required aromatic content for compatibility requirements and which can be hydrogenated to a light colored resin without significantly hydrogenating the aromatic content of the resin.

Using styrene instead of AMS in thermal reactions in combination with DCPD was found to produce lighter colored resin products, with low aromatic content, making it easier to hydrogenate the products to light colored tackifier resins. Additionally styrene, and similar vinyl aromatic monomers, are more active than AMS in thermal reactions and a higher conversion of styrene, or similar vinyl aromatic, to resin product is achieved as compared to AMS.

Using styrene to produce resin products with the desired aromatic content and tackifier properties, it would be desirable to incorporate from about 10% to about 25% styrene into the resin. However as learned from U.S. Pat. Nos. 5,502,140 and 5,739,239 this level of styrene produces resin product with an undesirable high molecular weight which is a disadvantage when the resin is used as an adhesive tackifier. This high molecular weight characteristic may be due to the formation of high molecular weight polystyrene by thermal initiation at the high temperatures required to form resins from DCPD.

U.S. Pat. No. 2,689,232 to Gerhart in 1954 teaches a method of copolymerizing CPD and vinylic hydrocarbons in a batch process. In order to avoid homopolymerization, the comonomers are cold-added to an autoclave and thereafter heated and pressurized for a holding period of two to six hours to accomplish the reaction. The extent of the reaction is controlled by timing the removal or reduction of heat. The resultant resin from this process is either brittle, or dark, or possessed of other undesirable properties for tackifier applications. As such, the patent teaches the use of an oil to dissolve the resin for useful applications.

EPO 0845484 A2 discloses the reaction of stoichiometric amounts of styrene and DCPD, with subsequent adjustment of aromatic content through hydrogenation. Disclosed reaction times range from 3.5 to 10 hours. In this example a high level of styrene was incorporated into the resin and extensive hydrogenation of the aromatic content was required to achieve the desired final resin color and compatibility properties.

It would be desirable to utilize styrene under reaction conditions that provide thermally polymerized resins based on DCPD monomers which have desirable aromatic content of about 10% to about 25% styrene, relatively low molecular weights, relatively high softening points, which do not contain significant amounts of polystyrene in the final resin product.

It would also be desirable to provide thermally polymerized resins and a process for producing such resins which achieve the desired aromatic content without the need for subsequent process adjustments.

It is further desirable to provide a method of production that offers near complete conversion of reactants to resin product in relatively short reaction times.

It would also be desirable to be able to run the thermal reactions to reduce or eliminate the formation of crystalline the DCPD wax which leads to plugging of filters during typical processing of DCPD resin products.

Lastly it is desirable to provide a method for producing DCPD thermal resins with aromatic content that requires less severe hydrogenation conditions for producing a light colored tackifier resin.

BRIEF SUMMARY OF THE INVENTION

The present invention includes a method of thermally producing styrene-modified DCPD resins which have a desirable aromatic content, relatively low molecular Weight, low color and relatively high softening points. In one aspect of the invention, there is included a resin which is the reaction product comprised of (1) about 5% to about 25% by weight of a compound of the formula:

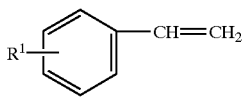

wherein $R^1$ is H, $C_1$-10 linear or branched aliphatic or aromatic, OH or OR, and R is alkyl or acyl; and (2) about 95% to about 75% by weight based on the total monomer content of a cyclic diolefin component comprising at least about 50% by weight dicyclopentadiene, said product containing minimal levels of high molecular weight styrenic polymer and exhibiting desirable low molecular weight characteristics. The resultant resins are desirably hydrogenated at least partially to form thermally stable derivatives.

In another aspect of the invention there is included a method of producing an aromatic-modified resin having a Mz of less than 2000 comprising the steps of: (i) providing solvent or a mixture of solvent and recycled reactives to a reactor, said recycled reactives comprised of DCPD and olefins and reactive oligomers derived from DCPD, along with low levels of styrene monomer (ii) heating said solvent or recycled reactants to a temperature of about 200° to about 260° C.; and (iii) adding a mixture comprised of about 5% to about 25% by weight styrene in combination with about 95% to about 75% DCPD monomer, into the reactor at the referred to temperature, at a rate to consume styrene monomer at the rate at which it is added such that the concentration of free styrene monomers in the reaction medium is held at a minimum at any given time of the reaction, e.g. less than about 5% by weight of the total reaction mixture.

In a variation of this invention a portion of the DCPD added to the reactor in combination with styrene at elevated temperature (step iii) can be instead added during the initial batch charge (step i) while maintaining the same ratio of fresh DCPD and styrene monomer added to the reaction. This requires that the level of styrene in the styrene/DCPD mixture added at the elevated temperature (step iii) be appropriately increased.

DETAILED DESCRIPTION OF THE INVENTION

There are several advantages associated with producing a resin product by thermally reacting a mixture comprised of DCPD and a pure vinyl aromatic feed instead of a crude C9 vinyl aromatic feed such as referred to in U.S. Pat. No. 5,171,793 which contain a large number of different reactive vinyl aromatic materials along with a substantial level of non-reactive alkyl substituted benzene compounds. Examples of a pure monomer feedstock include styrene, α-Methylstyrene, and 4-Methylstyrene where these examples are meant for illustration, not to be limiting. Pure monomer vinyl aromatics can also be any mixture or combination of different types of essentially pure vinyl aromatic monomers such that the mixture contains very little non-reactive material and the composition is also well defined. Specific advantages derived from using a pure vinyl aromatic feed instead of a crude vinyl aromatic feed, such as C9 type feeds derived from petroleum processing, include a) elimination of feedstock variability, b) elimination of non-reactive materials from the reaction feed where typically crude C9 type vinyl aromatic feeds typically contain from 30% to 70% non-reactive components, and c) the production of lighter colored resin products after the thermal reaction which decreases the difficulty of eliminating color during a subsequent hydrogenation step.

Monomers suitable for use as the cyclic diolefin component in the manufacture of the hydrocarbon resins of this invention include essentially pure DCPD (at least 95% by weight pure monomer), or mixtures of dicyclopentadiene with codimers comprised of cyclopentadiene and another diolefin from the group including methylcyclopentadiene, indene, isoprene, butadiene, and piperylene. Other olefinic components and/or non reactive components may be present at minor levels, though typically these components are not desired. For example, a mixture containing 50% to 95% or more DCPD and any of the aforementioned codimers may be employed. Specifically a DCPD feed designated as DCPD 101 grade from Lyondell Petrochemical, Houston, Tex. may be employed. This DCPD feed contains about 85% DCPD, the remainder comprised of codimers, the principle codimers derived from the reaction between cyclopentadiene with isoprene.

The vinyl aromatic monomer component includes components which have the formula:

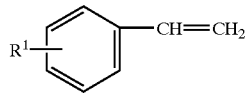

wherein $R^1$ is H, $C_1$-10 linear or branched aliphatic or aromatic, OH or OR, and R is alkyl or acyl. Styrene is the preferred vinyl aromatic component. Other pure styrenic monomers, e.g. 4-Methyl styrene, can be substituted for or used in combination with styrene. Additionally, other crude vinyl aromatic feeds can also be added in minor proportions to this vinyl aromatic component without changing the character of the invention.

Thus, styrene and ring substituted styrenes are included. Styrene, where $R^1$ is H, is the most desirable vinyl aromatic monomer component. The reaction mixture is formulated to contain the proper proportion of these components to produce a resin which comprises about 5% to about 25% by weight of the vinyl aromatic component. Amounts less than 5% are insufficient to provide enough aromatic content to significantly influence adhesive tackifier properties, and amounts greater than about 25% result in a resin with more aromatic character than needed to exhibit desired tackifier properties, requiring substantial hydrogenation of the aromatic content to achieve the desired tackifier properties.

It is desirable to react substantially all of the theoretical amount of vinyl aromatic monomer with the cyclopentadiene or other diolefins derived from the DCPD feed to minimize the polymerization of the styrene component to form undesirable high molecular weight polymer. The amount of vinyl aromatic monomer, the rate of addition, as well as the reaction conditions, e.g. temperature, collectively contribute to produce the optimal styrene-modified DCPD resin as the final reaction product.

Reactions can be carried out in solution or neat. Desirably, an aliphatic or aromatic solvent is used. The reaction process can be carried out in a continuous or batch process. If a continuous process is used, addition of the vinyl aromatic monomer component is made apportioned to favor the formation of phenyl norbornene. Batch processing can be carried out considerably more efficiently than batch processes which employ AMS, and with substantially no formation of polystyrene as compared to previous methods which attempted to employ styrene as the major vinyl aromatic monomer in the production of aromatic-modified DCPD resins.

The reaction scheme for the present invention can generally be represented by the following:

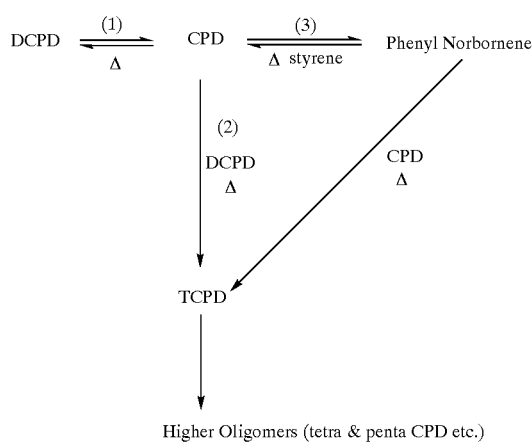

The relative rates of reaction of (2) and (3) are (3)>(2). Under the reaction conditions of the present invention, CPD reacts vigorously with styrene, exhibiting a rate constant about 10 times faster than for the comparable reaction of CPD with DCPD. Thus, one aspect of the present invention is to maximize this selectivity to obtain the desired reaction product. The desired initial reaction product may be represented by the structure:

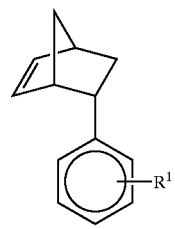

wherein $R^1$ is defined above, said structure including all the isomeric forms produced by the reaction. Desirably, the reaction product is predominantly phenyl norbornene, i.e. where $R^1$ is hydrogen. This initial product is an intermediate and reacts further to increase in molecular weight and form the resin product containing aromatic functionality.

The polymerization is carried out at a temperature of about 210° to 300°C., more desirably about 215° to 280°, and most desirably about 225° to 275° C. The reaction time is typically about 10 minutes to about 16 hours at the reaction temperature. Reaction times of about 120 to 140 minutes are particularly useful.

One of the advantages of the present invention is that significantly greater yields of styrene modified resins can be obtained over conventional methods using crude vinyl aromatic feeds, e.g. the present invention obtains yields of 90% or more and desirably 95–99%, as compared to yields of 60–80% typical of conventional processes.

The resins of this invention have a Ring and Ball (R&B) softening point in the range of about 90° C. to 140° C. The resins formed in accordance with the invention have a maximum Mz of about 2,500, more desirably about 1,200 to about 2,000; a maximum Mw of about 1000, and a maximum Pd of about 2.5.

For purposes of this invention, the following definitions apply. Mz (z average molecular weight) gives an indication of the high molecular weight tail in the resin and has a pronounced effect on the compatibility of the resin in an adhesive base polymer. High Mz is generally undesirable. Mw (weight average molecular weight) and Mn (number average molecular weight) provide information on the lower molecular weight portions of the resin and are defined in texts such as Polymer Science and Technology by J. Fried, Prentice-Hall Inc., 1995. Pd (polydispersity) describes the broadness of the molecular weight distribution and is the ratio of Mw/Mn. Mz, Mn, and Mw were determined by size exclusion chromatography using a refractive index detector, likewise described in the above reference.

Unlike cationically polymerized products made from similar monomers, thermally polymerized DCPD-based resins retain double bonds that can react further in various ways. Thermal reaction of DCPD based feedstocks produce low molecular weight oligomers are reactive and can be removed from the resin product by distillation before hydrogenation and recycled back into the reaction. In conventional DCPD-based resins using crude vinyl aromatic feeds introduced to the reaction with the fresh feed serves to dilute the recycle stream so that only a portion can be reused in the reaction at steady state while maintaining a constant concentration of non-reactive or inert diluent in the batch charges. In contrast, when pure vinyl aromatic monomers, such as styrene, are used in resin production little inert material is introduced with the fresh feed, and nearly all the unconverted reactives can be recycled.

When the copolymers of the invention are to be used as adhesive tackifiers from the copolymers of this invention, it is desirable to hydrogenate the copolymer to lighten the color and remove some or essentially all of the unsaturation, both aliphatic and aromatic, which in turn improves their thermal stability. Halogen and sulfur are essentially not present in the most desirable hydrocarbon resins of this invention. The feedstocks can be chosen to be essentially free of sulfur, and thermal polymerization avoids the need for Friedel Crafts catalysts such as aluminum chloride that cause chlorine to be organically bound to the resin product. The resins can then be economically hydrogenated with well known hydrogenation catalysts.

Catalysts for the hydrogenation of the copolymer resins of this invention comprise metals selected from Groups VIII, IB, IIB, VIB, and VIIB of the Periodic Table, which are typically used on a support such as aluminosilicate, alumina, carbon, charcoal, or kieselguhr. Cu/Zinc catalysts are preferred because they do not tend to destroy aromaticity during the reaction. For example, Cu 0890P, available from Engelhard Corporation, Chemical Catalyst Group, Iselin, N.J., USA, has been found to be useful. Catalysts such as nickel, paladium, e.g. Ni5136P & 5256P nickel catalysts from Englehard Corporation have been found to hydrogenate aromaticity during the reaction.

The hydrogenation can be run as a batch process or also as a continuous process utilizing either continuous stirred reactors or fixed bed catalyst reactors. The hydrogenation can be carried out neat or in solution, preferably using an aliphatic and/or naphthenic solvents when solvent is used. For example, 60% solids in recycled aliphatic hydrogenation solvent (RHS), a C9–C10 aliphatic plant process stream with low aromatic content. The temperature of hydrogenation may be from about 100° C. to about 320° C., preferably about 150° C. to about 300° C., and most preferably about 200° to 280° C. It is desired that the hydrogenation process time, either batch cycle time or mean residence time in a continuous process, be as short as possible to facilitate maximum production rates. As hydrogenation time is typically dependent on the rate of color removal, it is desirable that the DCPD thermal resin contain the minimum possible amount of colored species, and further that these species can be readily removed by hydrogenation.

Light color hydrogenated resins have good thermal stability that can be improved still further by the addition of small amounts of antioxidants such as, for example, IRGANOX 1010, a hindered phenol available from Ciba-Geigy, Hawthorne, N.Y.

The hydrogenated resins are useful as tackifiers for adhesives, caulking compounds, and sealants; in paints, labels and tapes; as modifiers, extenders and processing aids for plastics, painting inks, overprint varnishes and other clear coatings; in textile dry sizes, ceramic tile grout, varnishes, waterproofing compositions and wax compounds.

In the following examples, OMSCP means odorless mineral spirits cloud point, which is determined by the following procedure. Ten weight percent resin is mixed in a test tube with Shell Sol 70 odorless mineral spirits from Shell Chemical Co., Houston, Tex. The test tube is then heated until a clear solution is formed. The solution is cooled until turbidity is obtained. The onset of initial turbidity is recorded as the initial cloud point. Cooling of the test tube is continued until visibility is totally obstructed. The final cloud point is recorded at the point of no visibility.

MMAP is the mixed methylcyclohexane aniline cloud point, which is determined using a modified ASTM D-611-82 [1987] procedure. Methylcyclohexane is substituted for the heptane used in the standard test procedure. The procedure uses resin/aniline/methylcyclohexane in a ratio of 1/2/1 (5 g/10 ml/5 ml) and the cloud point is determined by cooling a heated, clear blend of the three components until complete turbidity just occurs. Hydrogenation of the unsaturated portion of a resin, particularly aromatic unsaturation would result in an increase in the MMAP.

R&B softening point is the Ring and Ball softening point determined according to ASTM E28-67.

To determine the Gardner color (G), 50 weight percent resin is mixed with reagent grade toluene at room temperature until it dissolves. The color of the resin solution is compared to a set of standards on a Gardner Delta Model 211-A Color Comparator, available from BKY Gardner, Inc., Silver Springs, Md., USA. The color values range from 1 to 18 with 18 being the darkest. The notation Gardner 1– (less than Gardner 1) is used to designate a water-white solution.

The Yellowness Index (YID) is obtained by direct readout from a Pacific Scientific Spectrogard™ Color System, model 96, available from BKY Gardner, Inc., using a measurement cell with a path length of 5.0 cm. The Yellowness Index is useful to distinguish colors lighter than Gardner 1. The closer the YID is to 0, the lighter the color. There is no direct correlation between Gardner colors and the YID, but experience has shown that Gardner 1 is approximately equal to a YID of 40 when both are measured as a 50% solution of resin in toluene, and the YID is measured with a measurement cell with a path length of 5.0 cm.

The laboratory thermal polymerization experiments were carried out in conventional stirred 600 cc autoclaves available from Parr Instrument Company, Moline, Ill., USA, equipped with an electronically controlled internal cooling loop and heated externally by an electric heating mantle.

In a conventional batch thermal reaction the monomer blend and solvent, when used, is charged to the autoclave and the apparatus is purged with nitrogen before heating. While stirring, the apparatus is brought to the desired reaction temperature. For convenience in the laboratory, quick heat-up at 2° C. to 5° C. per minute is preferred. After the desired reaction time at the specified temperature, the reactor and contents are cooled. The resin is isolated using conventional techniques which included removing solvent and unreacted materials under a nitrogen stream up to 235° C. and then removing low molecular weight oligomers under steam at 235° C. Steam stripping was accomplished in the shortest time possible (less than 30 minutes) to minimize molecular weight increases molecular weight increase in the thermally reactive resin.

In the improved batch thermal reaction of this invention the starting charge was comprised of solvent or recycle solvent containing inert diluent+recycled reactives from a previous reaction. Optionally a portion of the DCPD monomer and vinyl aromatic feed could also be added. The bulk of the vinyl aromatic monomer is charged to the reactor while at a temperature of 200° C. to 280° C., preferably between 220° C. and 260° C., in combination with the remainder of the DCPD charge. This procedure minimizes the formation of high molecular weight vinyl aromatic polymer by thermally activated polymerization of the vinyl aromatics (e.g. polystyrene formation from styrene monomer).

The laboratory hydrogenation experiments utilized 1-liter high pressure autoclaves. The general procedure was to charge resin, solvent if needed, and catalyst to the autoclave. After flushing to ensure a nitrogen atmosphere, 200 psig hydrogen was used for start-up. At 160° C., the hydrogen pressure was adjusted to 1200 psig and the final reaction temperature was achieved and maintained by selective heating/cooling as needed. When the desired reaction time was complete, the mixture was cooled, vented and flushed with nitrogen. Catalyst was removed by filtration and the hydrogenated products were isolated by distilling off solvent and oligomers. The final distillation was conducted under steam. Other specific conditions are given in the examples.

The following non-limiting examples are intended to further show various aspects of the invention, without limiting the intended scope or spirit of the invention.

EXAMPLES

Examples 1A and 1B

The following examples demonstrate a process for making a thermally polymerized DCPD with a high styrene content by adding the monomers in the proper manner to prevent the formation of high molecular weight polymer during the reaction. In Example 1A an amount of RHS, crude C9–C10 aliphatic process solvent, equal to 35% of the final batch charge was added to a 600 cc Parr reactor and heated to 200° C. at 5° C. per minute heating rate. At 200° C. the reaction was heated further to 270° C. at a slower 2° C. per minute heating rate, and during the 25 minute period between 200° C to 250° C. reaction temperature a mixture comprised of Lyondell DCPD 101 and styrene monomer at a 72/28 ratio by weight was pumped into the reactor at a constant rate, the final amount of addition amounting to 65% of the total batch charge. After reaching 270° C. the reaction was held for 100 minutes to further polymerize the reactants before being cooled to ambient temperature. The product solution was clear and exhibited a pale color prior to stripping to recover resin product. After steam stripping at 235° C. a resin product was recovered at a 55% level based on the starting solution weight, representing a yield of about 85% based on DCPD and styrene added to the reaction. The resin product exhibited a 94° C. R&B softening point and low 24° C. MMAP along with low molecular weight properties as listed in Table 1.

In Example 1B the volatile components recovered during the stripping of Example 1A resin were recycled back into the reaction and charged initially to the reactor instead of fresh solvent as used in Example 1A. The recycle solvent was added to the reactor at a 45% level based on the total batch charge. Example 1B reaction was run according to the same method as Example 1A except that the monomer charge was added while the reaction was heated between 200° C. to 250° C. The charge was a 72/28 DCPD/styrene mixture, but added at a level to constitute 55% of the total batch charge. After stripping the resin product was recovered at a 53% yield based on the product solution, representing a 96% yield based on the lower 55% fresh monomer charge to the reaction. Otherwise, the properties of Example 1B resin product were very similar to Example 1A, including the very desirable low Mz value measured by SEC. These results are tabulated in Table 1.

Comparative Examples 1A and 1B

Comparative Example 1A was run in a batch mode using the exact charge composition as in Example 1A, except that all the materials were charged to the reactor at ambient temperature before heating to 200° C. at 5° C. per minute heating rate and then further heating to 270° C. at a slower 2° C. per minute heating rate. The reaction was held for 100 minutes at 270° C. before cooling and discharging the product. The reaction yield and properties of the final resin after steam stripping were similar to the properties of Example 1A resin except for the molecular weight. As listed in Table 1, the Mz of the resin of Comparative Example 1A was 4350, as compared to the 1700 Mz value for Example 1A resin.

In Comparative Example 1B the recycle solvent recovered from stripping the Comparative 1A resin solution was added to the reaction charge at a 45% level, based on total charge, in the same manner as in Example 1B. However the monomer charge, comprised of DCPD 101 and styrene at a 72/28 ratio and added at a level of 55% based on the total charge, was added to the reactor batch before heating was started. The reaction was heated to 270° C. and held for a 100 minute reaction time at this temperature as in Example 1B. After stripping to recover the resin, a product was recovered at a similar high yield and with similar properties relative to Example 1B resin except for the molecular weight. The resin of Comparative Example 1B exhibited an undesirable 3170 Mz value measured by SEC compared to the low 1610 Mz value measured for the resin of Example 1B.

Example 2

A reaction was run in the same manner as described in Example 1A except that the monomer charge was added at a reaction temperature between 200° C. to 250° C. and composed of a mixture of DCPD 101 and styrene at a 82/18 weight ratio, the mixture added at the same 65% level based on the total reaction charge. The properties of the product recovered after the 100 minute reaction at 270° C. are listed in Table 1. The recovered resin yield was similar to Example 1A resin and exhibited a similar R&B softening point, but exhibited a higher 32° C. MMAP value. The MMAP for this product was higher than the value for Example 1A because of the lower level of styrene incorporation in Example 2 product. Resin produced in Example 2 again exhibited a low Mz value of 1620 due to the method by which the monomers were added to the reaction.

Comparative Example 2

Comparative Example 2 was run in a manner similar to Example 2 using the same batch charge composition, but adding all the ingredients to the batch charge before the start of the reaction heat up. The properties of the resin recovered from this reaction listed in Table 1 indicate that the yield, softening point, color, and MMAP value of the product were comparable to Example 2 except for the higher molecular weight values. The Mz value for the resin from Comparative Example 2 was 2050, significantly higher than the value for Example 2 where the monomer was added in the proper fashion to achieve the desired low Mz value.

Reaction Series in Thermal Polymerization Study

Four distinct examples are presented, comprising a total of 13 thermal polymerization reactions in the Examples listed in Table 2. Each of these reactions was coupled to another reaction in the series, meaning, that the "recycle solvent" for each reaction in Table 1 was generated during the stripping of the product solution generated from the previous reaction in the series. For example, the recycle charge for 3B was recovered from the reaction of Example 3A, while in another example the recycle for the first reaction of Example 4 (4A) was recovered from the last reaction of Example 3 (3A), and so forth. In actual practice it was not possible to recover all the recycle solvent from the previous reaction because of handling and transfer losses, and in practice the recycle solvent was comprised of 94% to 97% of recycle solvent recovered from the previous reaction, along with a small amount of recycle solvent of similar composition. The reactions in each test series were run under nearly the same conditions to demonstrate that consistent "steady state" results were achieved in the series. Example 3 type resin is characterized by a nominal 40° C. MMAP and 105° C. R&B. Example 4 type resin is characterized by a 40° C. MMAP and slightly higher 110° C. softening point. Example 5 type resin is characterized by a higher aromatic content and lower 32° C. MMAP.

Examples 3A, 3B and 3C

The reactions in this series were similar in that the recycle solvent added to the reactor at the start comprised 60% of the total reaction charge. The remaining 40% of the charge was a mixture of Lyondell 101 DCPD and styrene monomer pumped into the reactor over a 30 minute period at 245° C. After the 40% monomer charge was pumped in at 245° C. the reactions were heated to 265° C. and held for 120 minutes before cooling and discharging the reactor contents. While these parameters were held constant, the styrene level in the monomer charge for the three reactions of Examples 3A, 3B, and 3C was varied from 7.5% to 10% to 12.5% respectively. The intent was to produce a resin precursor with a nominal 100° C. softening point containing from 7.5% to 12.5% incorporated styrene.

After stripping to recover the resin intermediate, a thermal poly yield of about 95% (40% monomer in, 38% solids out) was consistently measured for Examples 1A, 1B, and 1C. The high yield are due to the effective recycle of unreacted components from the previous reaction which was possible because both the DCPD 101 and styrene feeds contained low levels of non-reactive (inert) components.

The softening point appeared to decrease slightly as the styrene level in the feed increased, measured to be about 103° C. at a 10% styrene level in the monomer mix. The MW values for all the products in the series were low, with nominal Mz values of 1200 by SEC. The method by which the monomer was added contributed to achieving the low Mz values for these products. The polymerization solution developed a faint haze after aging for several days at ambient temperature, the haze attributed to low level of crystalline DCPD wax in the product solution. Based on the low MW values and light color, the reactions of Examples 4 were run using a longer reaction time at 265° C. to further reduce the trace amount of wax while retaining low MW properties.

Example 7

The three products of Examples 3A, 3B, and 3C were combined in a 60% solids solution in RHS (C9-C10 aliphatic solvent) and hydrogenated using Englehard Ni5256P catalyst for 1 hour at 275° C. under 1200 psi hydrogen pressure. The resin consumed a typical 2.2% hydrogen (based on resin), was decolorized to a 3.5 YID (5 cm. Cell) under these mild hydrogenation conditions, and the hydrogenated resin solution exhibited no haze. As indicated in Table 2, the hydrogenated product from Example 1 resins exhibited a low OMSCP and very low MW values. Based on the % solids measurement before and after hydrogenation it appeared that a 97% hydro yield was achieved. The R&B softening point of the hydrogenated resin was 120° C. It is significant that the resin was hydrogenated to a very light colored product after a relatively short hydrogenation time at a relatively mild hydrogenation temperature.

Example 10

This hydrogenated product, X-32033-85, was extrusion compounded with polypropylene homopolymer at a 35% resin level and the extruded strands were cooled and pelletized. It was noted that the strands and pellets from this blend were crystal clear, even after cooling. This is unusual behavior because similar (PP+resin) blends made from Res A-2468 products or Escorez 5340 resin always form very hazy, translucent to opaque, strands and pellets. In contrast Escorez 5320 resin forms transparent blends similar to blends from sample X-32033-85. Escorez 5320 and Escorez 5340 are hydrogenated resins, commercially available from Exxon Mobil Chemical. Small amounts (5 to 10 wt%) of hydrogenated styrene units in the resin appears to greatly improve the compatibility of the resin with polypropylene polymers.

Examples 4A, 4B, 4C

In this series the charge again was comprised of 60% recycle solvent and 40% monomer, where the monomer composition was held at [90% DCPD 101+10% styrene]. The 40% monomer charge was added at 245° C. in the same manner as in Examples 3, and after adding the monomer at 245° C. the reaction temperature was raised to 265° C. and held for a 140 minute soak period in the later reactions in the series. The effect of the extended soak time was to reduce the amount of waxy haze to a trace level while increasing the yield to nearly 100% (40% monomer in, 39% resin out). Extending the soak time slightly increased resin color (G5+) and resin molecular weight (Mz~1300).

The resin products recovered in Examples 4B and 4C after stripping exhibited a nominal 110° C. softening point and 40° C. MMAP. The softening point was increased relative to Examples 3B, 3C, and 4A due to the 20 minute longer reaction time at 265° C. The products exhibited low MMAP related to the level of styrene incorporation. Additionally The resins of Examples 4A, 4B, and 4C exhibited light color, high yields, and low Mz characteristics which are attributed to the use of pure styrene monomer as the vinyl aromatic feed, the use of an optimized recycle scheme, and the use of the correct addition method of adding styrene monomer at high temperatures to achieve controlled molecular weight properties.

Example 8

The three resin samples from Examples 4A, 4B, and 4C were combined as a 60% solids solution in RHS and hydrogenated for 1 hour at 275° C. under 1200 psi hydrogen using Englehard Cu 0890P catalyst, producing resin sample Example 8 in Table 3. The color of the hydrogenated poly oil was a very light 3.5 YID (5 cm. Cell) and exhibited no haze. The resin product after stripping exhibited 56° C. MMAP and <-70° C. OMSCP with a low Mz value of 1100. The softening point was 108° C. The calculated hydrogenation yield was 94% while the thermal polymerization yield was nearly 100%. Using the Cu0890P catalyst left the bulk of the aromatic content in the resin unhydrogenated, accounting for the low 56° C. of the hydrogenated product.

Examples 5A, 5B, 5C

Additional examples were run using the method utilized in Examples 3 and Examples 4. In Examples 5A, 5B, and 5C the charge ratio was maintained at 60% recycle and 40% monomer (added at 245° C.) but the level of styrene in the monomer charge added at 245° C. was increased to [82% DCPD 101 and 18% styrene]. The charge ratio was reduced to 63% recycle/37% monomer in Example 5C in order to reduce the R&B of the thermal resin slightly. The target was to make an resin intermediate with about 18% incorporated styrene exhibiting a 100° C. R&B and nominal 32° C.

MMAP with low Mz values. The soak time after monomer was added was 130 minutes at 265° C. Properties of the resins produced in these three Examples are tabulated in Table 2.

Three reactions were run in this series, Examples 5A and 5B using a 40% monomer charge and Example 5C using a 37% monomer charge. The yields ranged from 94% to 98% (based on monomer) while the softening point of the resin intermediate, after stripping to recover the recycle solvent, ranged from 100° C. to 104° C. Example 5C reaction at the lower 37% monomer charge level gave the lower R&B and higher yield values while the first two reactions at the 40% monomer charge level gave a 3° C.–4° C. higher R&B softening point. The color of the product solutions was G5+. The products from all three reactions in Examples 5 were very similar and exhibited a nominal 100° C. softening point and low 32° C MMAP with low molecular weight characteristics while being produced at an average 96% yield based on monomers.

Example 9

The three products from Examples 5A, 5B, and 5C were combined as a 60% solids solution in RHS solvent and hydrogenated for 1 hour at 275° C. under 1200 psi. hydrogen pressure using Cu 0890P catalyst. The results of the hydrogenation are listed in Table 3. The color of the hydrogenated solution was a very light 4.0 YID (5 cm. cell) despite the mild hydrogenation conditions, and the yield of R&B 100° C. resin after hydrogenation was a 96% based on change in % solids before and after hydrogenation. The hydrogenated product exhibited desirable tackifier properties, including, 100° C. R&B softening point, low OMSCP (<−70° C.), low MMAP (48° C.) and low MW (Mz~1200). The MMAP value is indicative of a substantial aromatic content in the final hydrogenated resin product due to the hydrogenation catalyst choice. The residual aromatic content gives the resin product desirable compatibility and tackification properties.

The combination of utilizing thermal reaction conditions to make a light colored resin before hydrogenation coupled with the selection of the proper hydrogenation catalyst combined to produce a very light colored resin product.

Examples 6A, 6B, 6C, 6D

Examples 6, A to D represents a transition back to low aromatic content product from the series Examples 5A, 5B, 5C, which generated product containing about 18% incorporated styrene.. In the reactions of Examples 6 the feed ratio was increased to 57% recycle and 43% monomer and the soak time was 140 minutes at 265° C. Otherwise the reaction procedure was similar to the method of Examples 3, 4, and 5. The reactions of Example 6 utilized a lower recycle charge but the same soak time relative to the reactions of Examples 4. Reducing the recycle to monomer ratio in the reactions of Examples 6 increased the softening point of the thermal resin product. As illustrated in Table 2 the softening point of the products did increase to about 115° C. The first reaction in this series, Example 6A, used recycle from Example 5C made using a higher styrene charge level, with no adjustments to compensate for recycle composition. There were only minor differences measured for this transition product (Example 6A), namely a 2° C. lower MMAP and slightly lower R&B relative to the other reactions in this series (Examples 6B, 6C, 6D). The process in the reactions of Examples 6 again exhibited excellent yields greater than 95% based on added DCPD+styrene, and also exhibited a pale color before hydrogenation.

The resin intermediates from the reactions of Examples 6 exhibited a nominal 115° C. softening point and 42° C. MMAP with Mz value of only 1380. The measured yield of nominal 115° C. resin was 94%–97% (based on monomer).

TABLE 2

| | Examples 3 | | | Examples 4 | | | Examples 5 | | | Examples 6 | | | |
|---|---|---|---|---|---|---|---|---|---|---|---|---|---|
| Example | 3A | 3B | 3C | 4A | 4B | 4C | 5A | 5B | 5C | 6A | 6B | 6C | 6D |
| % Recycled | 60% | 60% | 60% | 60% | 60% | 60% | 60% | 60% | 63% | 57% | 57% | 57% | 57% |
| % Monomer | 40% | 40% | 40% | 40% | 40% | 40% | 40% | 40% | 37% | 43% | 43% | 43% | 43% |
| % DCPD 101 | 92.5% | 90% | 87.5% | 90% | 90% | 90% | 82% | 82% | 82% | 90% | 90% | 90% | 88% |
| % Styrene | 7.5% | 10% | 12.5% | 10% | 10% | 10% | 18% | 18% | 18% | 10% | 10% | 10% | 12% |
| Soak Time @ 265° C. (In Minutes) | 120 | 120 | 120 | 120 | 140 | 140 | 130 | 130 | 130 | 140 | 140 | 140 | 140 |
| R&B S.P. (in ° C.) | 110 | 103 | 103 | 106 | 108 | 111 | 103 | 104 | 101 | 109 | 112 | 116 | 114 |
| Color | G5 | G5 | G5 | G5 | G5+ | G5+ | G5+ | G5+ | G6− | G5+ | G5+ | G5+ | G6− |
| OMSCP (in ° C.) | 59/18 | 66/28 | 76/44 | 59/30 | 29/16 | 27/13 | 25/11 | 24/12 | 12/5 | 20/10 | 67/40 | 52/25 | 20/11 |
| MMAP (in ° C.) | — | — | — | — | 39.8 | 40 | 33.7 | 32.7 | 31.2 | 40 | 41.7 | 42.1 | 41.1 |
| SEC MPS Mz | 1201 | 1162 | 1234 | 1217 | 1326 | 1300 | — | 1327 | 1296 | 1367 | 1377 | 1383 | 1377 |

| Designation | Comparative Ex 1 X-32570-99 | Comparative Ex. 1B X-32724-5 | Example 1 X-32724-2 | Example 1B X-32724-4 | Comparative Ex. 2 X-32570-100 | Example 2 X32724-3 |
|---|---|---|---|---|---|---|
| % RHS | 35 | — | 35 | — | 35 | 35 |
| % Recycle | — | 45 | — | 45 | — | — |
| % Monomer | 65 | 55 | 65 | 55 | 65 | 65 |
| Monomer Composition | | | | | | |
| DCPD/Styrene | 72/28 | 72/28 | 72/28 | 72/28 | 82/18 | 82/18 |
| Monomer Addition Method | Batch | Batch | High Temp. Add | High Temp. Add | Batch | High Temp. Add |

TABLE 2-continued

| | | | | | | |
|---|---|---|---|---|---|---|
| Rxn. Temperature | 270° C. | 270° C. | 270° C. | 270° C. | 270° C. | 270° C. |
| Reaction Time | 100 min. | 100 min. | 100 min. | 100 min. | 100 min. | 100 min. |
| Color | | | | | | |
| YID (5 cm cell) | 133 | 129 | 134 | 131 | 127 | 129 |
| Gardner | 8.7 | 8 | 8.1 | 8.6 | 7.7 | 7.8 |
| R&B Softening Pt. | 96° C. | 94° C. | 94° C. | 94° C. | 95° C. | 101° C. |
| MMAP | 25.0° C. | 24.4° C. | 23.9° C. | 25.3° C. | 32.7° C. | 31.5° C. |
| % Solids | 56.1 | 52.2 | 55.1 | 53.0 | 56.8 | 54.8 |
| Yield (on monomer) | 86% | 95% | 85% | 96% | 87% | 84% |
| MW by SEC | | | | | | |
| Mn | 367 | 359 | 360 | 356 | 333 | 340 |
| Mw | 1070 | 963 | 858 | 827 | 836 | 799 |
| Mz | 4350 | 3170 | 1700 | 1610 | 2050 | 1620 |
| Hydrogenation Results | | T-1120 Type | V-1120 Type | V-1100 Type | Resin Solution for Hydro Was Spilled | |
| Solution YID (5 cm) | | 3.5 | 3.5 | 4.0 | | |
| R&B Softening Pt. | | 120° C. | 108° C. | 100° C. | | |
| MMAP | | | 56° C. | 47.8° C. | | |
| SECMPS: Mz | | 1029 | 1103 | 1215 | | |

What is claimed is:

1. A resin composition comprising the copolymerization reaction product of a monomer mixture comprising: (1) about 5% to about 25% by weight of a monomer compound of the formula:

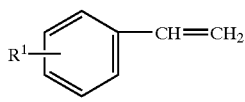

I wherein $R^1$ is H, $C_{1-10}$ linear or branched aliphatic or aromatic, OH or OR, wherein R is alkyl or acyl; and (2) about 75% to about 95% by weight of a cyclic diolefin component comprising at least about 50% by weight dicyclopentadiene, wherein the resin has a Mz of less than about 2,000, said resin made by the process comprising the steps of (i) providing a solvent to a reactor; (ii) heating said solvent to a temperature of about 200° C. to about 265° C.; and (iii) adding the monomer mixture to the reactor, at a rate such that the concentration of free monomer compound of formula I in the reactor is held at a minimum at any given time of the reaction to minimize the formation of monomer compound homopolymer.

2. The resin composition of claim 1 wherein said monomer compound of formula I is selected from the group consisting of styrene, α-methylstyrene, 4-methylstyrene, and mixtures thereof.

3. The resin composition of claim 2 wherein said monomer compound is styrene.

4. The resin composition of claim 2 wherein the monomer mixture comprises about 5 to about 15% by weight of the monomer compound of formula I and about 85 to about 95% dicyclopentadiene monomer.

5. The resin composition of claim 1 wherein said process further comprises (iv) recovering at least a portion of the solvent and unconverted monomer reactants and (v) adding the recovered solvent and unconverted monomer reactants to the solvent of step (i).

6. The resin composition according to claim 1 wherein said cyclic diolefin is pure dicyclopentadiene or mixtures of dicyclopentadiene with codimers; wherein said codimers comprise cyclopentadiene and another diolefin selected from the group consisting of methylcyclopentadiene, indene, isoprene, butadiene, and piperylene.

7. The resin composition according to claim 1 wherein said resin composition has a Ring and Ball softening point in the range of about 90° C. to 140° C.

8. The resin composition according to claim 1 wherein said resin composition has a Mz ranging from about 1,200 to about 2,000.

9. The resin composition according to claim 1 wherein said resin composition has a maximum Mw of about 1,000.

10. The resin composition according to claim 1 wherein said resin composition has a maximum polydispersity of about 2.5.

* * * * *